P. M. BENEDICT.
WIRE OR CABLE CLAMP.
APPLICATION FILED OCT. 9, 1916.
1,307,340.
Patented June 24, 1919.
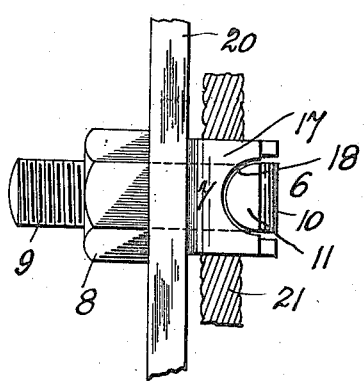
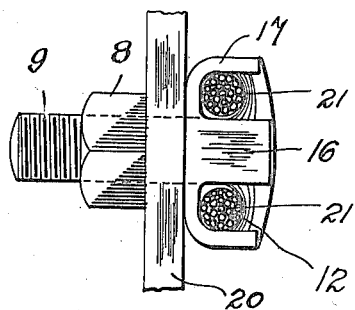
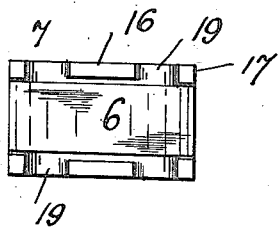
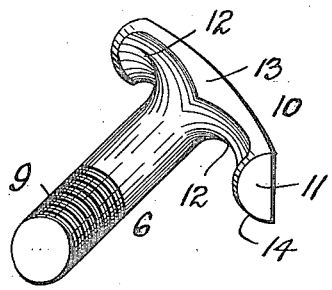
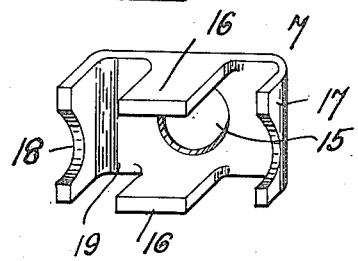
WITNESSES:
F. A. Carlson
INVENTOR.
Paul M. Benedict
BY
ATTORNEY.

UNITED STATES PATENT OFFICE.

PAUL M. BENEDICT, OF NEW HAVEN, CONNECTICUT, ASSIGNOR TO THE B & K MFG. CO., OF MILLDALE, CONNECTICUT, A CORPORATION OF CONNECTICUT.

WIRE OR CABLE CLAMP.

1,307,340. Specification of Letters Patent. Patented June 24, 1919.

Application filed October 9, 1916. Serial No. 124,620.

*To all whom it may concern:*

Be it known that I, PAUL M. BENEDICT, a citizen of the United States, residing in the city and county of New Haven, State of Connecticut, have invented certain new and useful Improvements in Wire or Cable Clamps, of which the following is a full, clear, and exact description.

This invention relates to wire or cable clamps, and it has special reference to a clamp for use in securing a ground lead or connection to a pole or other support for a high tension transmission line. When used for this purpose my improved clamp is adapted to firmly clamp one or more wires or cables to an upright member in the nature of a pole or the like, to which the clamp is detachably secured. The improved device will, however, be found useful when used for other purposes.

One of the main objects of the invention is the provision of a simple, serviceable clamp of relatively few parts and small dimensions, which can be very readily and economically manufactured.

To this and other ends, the invention consists in the novel features and combinations of parts to be hereinafter described and claimed.

In the accompanying drawing,

Figure 1 is a side elevation of a clamp embodying my improvements;

Fig. 2 is a top plan view of the parts shown in Fig. 1;

Fig. 3 is a view of the clamp, detached from its support, looking toward the head of the clamp;

Fig. 4 is a detail perspective view of the clamping bolt; and

Fig. 5 is a detail perspective view of the box-like member, in which the wire or other article is clamped by the bolt.

My improved clamp comprises three main parts, viz., a clamping bolt 6, a box-like member 7 coöperating therewith, and a nut 8 adapted to engage screw threads 9 on the shank of the bolt 6. This bolt has a T head 10 having flat ends 11 and curved seats 12 at the under surface of the T head at opposite sides of the shank. The longer sides of the T head are preferably flattened, as shown at 13, and the extremities of the head are rounded at their under portions, as shown at 14. In the particular form shown, the upper or outer surface of the head is curved in a longitudinal direction but flat in a transverse direction, the extremities 11 being in the form of depending ears of substantially semi-circular shape.

The shank of the bolt 6 is adapted to pass through a central opening 15 in the box member 7. This box member may be advantageously formed from a single sheet metal blank in which the hole or perforation 15 is formed by punching. The box is of elongated rectangular shape, and along its longer sides it is provided with bent up cheeks 16 adapted to fit against opposite sides of the T head of the bolt. Along the shorter sides of the box, the same is provided with bent up walls 17, which are provided at their free edges with semi-circular cut away portions 18 to receive the corresponding ears at the extremities of the head. Each of the cheeks 16 is located intermediate of the ends of the box and is spaced from both of the end walls 17, so as to provide transverse channels 19 through the box on opposite sides of the center to receive the cables 21 or other articles to be clamped. The nut 8 previously mentioned is adapted to be screwed up on the shank of the bolt for forcing the T head of the bolt down into the box. In the operative position, the flat surfaces 13 at the longer sides of the head are in close proximity to the inner faces of the cheeks 16, and the lips of the extremities of the head extend into the notches 18. As the nut is tightened, the head is drawn gradually into the box, and the cables 21 are thereby tightly clamped in the seats 12 at the under portion of the head by the bottom portions of the box on opposite sides of the center. In practice, the bolt and box member are assembled with the cable or cables in the proper position, and the shank of the bolt is then passed through an opening in a suitable upright 20 or other support, after which the nut 8 is applied to the protruding end of the bolt shank in the manner shown in Figs. 1 and 2. It will be observed that when the parts are in this position, the tightening up of the nut will clamp the cables very effectively in the corresponding transverse channels of the box member. The T head of the bolt is effectively locked in position by engagement in the notches 18 and between the cheeks 16, and the assemblage is very reliable and efficient.

It will be observed that the cheeks 16 are slightly deeper than the end walls 17. In assembling the device, the cheeks engage the longer sides of the head before the lips at the extremities of the head are fully seated in the notches 18, and in this way the head and the box member will tend to center each other as they are brought together.

Without limiting myself to the precise construction shown, I claim:

1. In a clamp, the combination of a sheet metal box-like member having a central bolt opening and channels on opposite sides of said opening to receive cables, and a bolt having a shank engaging said opening and a T head extending transversely across said channels, said box-like member having cheeks to center said head, and upwardly bent end walls having notches to receive the extremities of the head; substantially as described.

2. In a clamp, the combination of a box-like member formed of sheet metal and having a bottom with an opening formed therethrough and spaced struck-up side and end walls, said side walls being of less length than the distance between the opposite end walls, whereby channels are formed across the box-like member between the side and end walls to receive cables, and a T bolt having its shank mounted in said opening with its head extending across said channels to clamp the cables in said channels, said end walls having notches formed therein to receive the extremities of said head.

3. In a clamp, the combination of a box-like member formed of metal and having a bottom with an opening therethrough and spaced upwardly directed side and end walls, said side walls being of less length than the distance between the opposite end walls, whereby channels are formed across the box-like member on each side of said opening and between said side and end walls to receive cables upon the bottom of the box-like member, and a T bolt having its shank mounted in said opening and its head overlying said cables to clamp the same in said channels upon the bottom of the box-like member.

4. In a clamp, a box-like member of sheet metal having a bottom with an opening formed therethrough and marginal side and end portions turned-up to form an inclosure, the side walls being of less length than the distance between the opposite end walls, whereby channels are formed by the side and end walls across the box-like member and flush with the bottom thereof to receive cables, and a T bolt having its shank mounted in said opening for clamping the cables in said channels.

In witness whereof, I have hereunto set my hand on the 6th day of October, 1916.

PAUL M. BENEDICT.